Figures 1, 2:
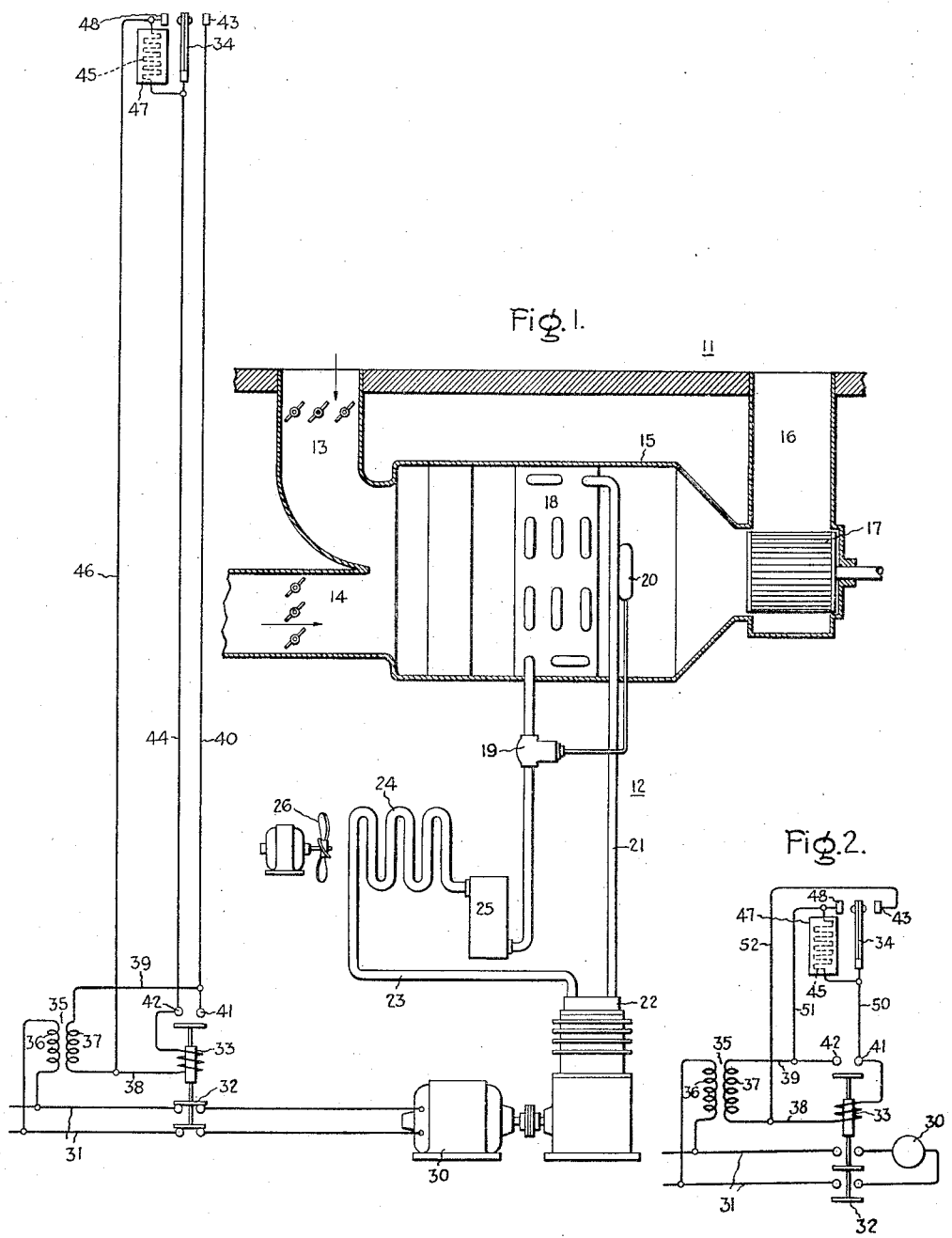

June 11, 1940.  H. R. CRAGO  2,204,403
METHOD OF AND APPARATUS FOOR COOLING
Filed Feb. 12, 1936

Inventor:
Harry R. Crago,
by Harry E. Dunham
His Attorney.

Patented June 11, 1940

2,204,403

UNITED STATES PATENT OFFICE 2,204,403

METHOD OF AND APPARATUS FOR COOLING

Harry R. Crago, Caldwell, N. J., assignor to General Electric Company, a corporation of New York Application February 12, 1936, Serial No. 63,529

17 Claims. (Cl. 236—68)

My invention relates to temperature control, and particularly to a method of and apparatus for cooling a building, room or the like.

An object of my invention is to provide a method of cooling in which the cooling apparatus is operated to maintain a cooled space at a temperature that is varied in accordance with the percentage of time the cooling apparatus is in operation during a predetermined period.

Another object of my invention is to operate the cooling apparatus to maintain a space at a minimum temperature when the operation of the cooling apparatus is substantially suspended, a maximum temperature when the apparatus is in substantially continuous operation, and temperatures increasing from said minimum to said maximum value as the percentage of time that the cooling apparatus is in operation increases during a predetermined period. Between the maximum and minimum temperatures the cooling apparatus operates only during the time that the space temperature exceeds a variable value which is always being varied between the minimum and maximum temperatures in accordance with the relative lengths of time that the space temperature is above and below said variable value, i. e., the variable temperature value increases as the percentage of time that the space temperature exceeds said variable value increases and vice versa.

As progress has been made in cooling it has become increasingly evident that it is not desirable to maintain the temperature of the cooled space at a constant value. The reason for this is that a person entering or leaving the cooled space is subject to a certain shock as he passes from a space at one temperature level to a space where the temperature is at another level. This shock has been eliminated to a great extent by maintaining the cooled space at higher temperatures as the outdoor temperature increases. The cooling effect, as experienced by the person passing from the region of higher temperature level to that of the lower level, has not been decreased by this method of eliminating the shock because of the fact that the person will feel comfortable at a higher temperature on a very hot day. To effect this differential control the cooling apparatus has heretofore been under joint control of thermostatic means positioned within and without the cooled space.

It is an object of my invention to provide a control in which only an indoor thermal responsive means is required and in which the temperature maintained within the cooled space is varied by varying the calibration of the indoor temperature responsive means in accordance with changes in the percentage of time the cooling apparatus is in operation. More specifically, I provide the thermal responsive means with a calibration control means having a local source of heat adapted to be energized only when the cooling apparatus is inoperative. The heat source, which may be an electric resistance, is preferably encased in material having a fairly large thermal inertia to give it a high time constant. In this way, the calibrating effect on the thermostat is made dependent on the length of time that the refrigerating apparatus is in operation as compared to the length of time it is not in operation as its average heating effect is governed only by the energy input. As the percentage of time the cooling system is in operation changes the heating effect of the resistance changes to vary, in effect, the calibration of the thermostat.

My invention will be better understood from the following description when considered in connection with the accompanying drawing and its scope will be pointed out in the appended claims. In the accompanying drawing Fig. 1 illustrates a schematic diagram of one embodiment of my invention; and Fig. 2 illustrates a modified form of electrical connections that may be used.

In Fig. 1 I have illustrated a space to be cooled by reference numeral 11. This space may be a room, group of rooms, or building or any space which it is desired to be cooled. The space is cooled by any of the well-known types of cooling apparatus and in my preferred embodiment I have illustrated the apparatus as being a compressor-condenser system 12. The air is withdrawn from the cooled space through a duct 13 and a desired amount of fresh air is added thereto through a duct 14. After being cooled within a cooling chamber 15 the air is forced into the room through a duct 16 by means of a motor-driven fan 17 (motor not shown). The air is cooled within the cooling chamber 15 by means of an evaporator 18 of any desired type. The admission of refrigerant to the evaporator is controlled by means of a thermostatic expansion valve 19 and its associated thermostatic bulb 20 positioned adjacent the evaporator coils. The refrigerant flows from the evaporator through a conduit 21 to compressor 22 and the compressed refrigerant then flows through conduit 23 to the condenser 24, from which it flows to the liquid receiver 25. The condenser is cooled by any convenient means and I have illustrated the same as cooled by an electrically driven fan 26, the driving motor of which may be supplied with power from any convenient source.

In the embodiment illustrated the compressor 22 is driven by an electric motor 30 connected to any suitable source of electrical energy 31 by means of a relay actuated switch 32 which, as may be seen from the drawing, is adapted to close the motor circuit when its associated relay is deenergized. The energization of the relay 33 is under the control of a thermal responsive device 34, which may be of the bimetallic type, positioned within the space to be cooled. The control system is supplied with power from the source 31 through a transformer 35 having a primary winding 36 and a secondary winding 37. One terminal of the latter is connected to the relay 33 by means of a connection 38 and the other terminal is connected by means of connection 39 to electrical connection 40, the latter interconnecting contacts 41 and 43 associated with the relay and room thermostat respectively. One terminal of the relay is also connected to contact 42 which, with contact 41, forms part of a holding circuit for the relay 33. Contact 42 is connected to the thermostat 34 by means of an electrical connection 44 and a resistance element 45 positioned adjacent the thermostat and adapted to affect the latter locally is connected directly across the latter and an electrical connection 46 leading to one terminal of the transformer secondary winding through electrical connection 38. The resistance element 45 is preferably constructed with a high time constant for a purpose to be described later by encasing it in a suitable heat storage material such, for instance, as a porcelain body 47. Resistance element 45 and electrical connection 46 are also connected to a contact 48 associated with the thermostat 34.

The thermostat 34 is so positioned that it will deflect to the right in response to a decrease in temperature and to the left on an increase in temperature. When the thermostat is in the position illustrated in Fig. 1 relay 33 is deenergized and motor 30 is energized to operate the cooling apparatus. When the room has been cooled sufficiently, thermostat 34 engages its associated contact 43 to close an energizing circuit for relay 33 and the latter immediately opens switch 32 to deenergize the compressor motor 30. At the same time a holding circuit for the relay 33 is established through the closure of contacts 41 and 42 and heating resistance 45 is also energized because it is connected in parallel with the relay 33. As the temperature within the room increases the thermostat 34 will deflect to the left and finally engage contact 48 to place a short circuit around the relay to deenergize it and the control system will again assume the position indicated in Fig. 1. Contacts 48 and 43 may thus be termed the "on" and "off" contacts of the thermostat as engagement of them by the thermostat initiates and terminates operation of the cooling apparatus.

The thermostat 34 is constructed to operate from one of its positions to another at a very low temperature differential such as 1° F. or less. In order that the system operate in the desired manner, it is necessary that the resistance 45 or pre-heat coil, as it is commonly designated, have a heating capacity sufficient to vary the temperature of thermostat 34 an amount greater than that necessary to operate the latter to its respective control positions. For the purpose of better illustrating the operation I will assume that it has a heating capacity sufficient to raise the temperature of the thermostatic element about ten degrees when the resistance 45 is continuously energized. The pre-heat coil 45 furthermore is constructed with a high time constant, that is, a period of time of appreciable length is required to increase the temperature of the preheat coil 45 from the minimum to the maximum value when it is continuously energized and a similar period is required for the temperature of the pre-heat coil 45 to decrease from the maximum to the minimum value when it is deenergized for the purpose of preventing the operating cycles of the cooling apparatus from being too short and at the same time obtain the necessary amount of pre-heat for the thermostat.

In order to better describe the operation of the system I shall assume that the thermostat 34 will operate with a temperature differential of 1° F. and that it will move into engagement with contact 43 at a temperature of 84° F. and into engagement with contact 48 at a temperature of 85° F. Then, assuming that the temperature within space 11 is between 84° and 85°, the thermostat 34 will be in a position intermediate its contacts and, since the relay 33 is deenergized, the switch 32 will be in its lowermost position in which motor 30 is energized and the refrigerating system in operation, as described above and in a manner well known to those skilled in the art. The space 11 is cooled by the circulation of air induced by the motor driven fan 17, and when the temperature of the space decreases to 84° the thermostatic member 34 deflecting to the right will engage contact 43, thereby energizing relay 33 through a circuit which is as follows: transformer secondary winding 37, electrical connection 38, relay 33, electrical connection 44, thermostat 34, electrical connection 40, and electrical connection 39 back to the secondary winding. The energization of relay 33 results in the upward movement of its associated armature whereby switch 32 is moved to disconnect motor 30 from supply 31 and contacts 41 and 42 are closed to establish a holding circuit for the relay. The holding circuit extends from the secondary winding of the transformer through electrical connection 38, relay winding 33, contacts 42 and 41 interconnected by the upper contact bridging member of the relay and connection 39. The deenergization of motor 30 upon the opening of switch 32 terminates the operation of the refrigerating apparatus and consequently the temperature within the room 11 will gradually increase at a rate depending upon the temperature of the surrounding atmosphere.

The manner in which increasing temperatures are maintained within the room 11 as the percentage of time that the cooling apparatus is in operation increases may best be understood from a consideration of the operation of the system as the outdoor temperature increases from a low value to a high value. At a low temperature it is obvious that no cooling will be required and that thermostat 34 will naturally remain in engagement with contact 43, in which position the relay 33 will be energized and the compressor motor 30 deenergized. Also, in this position the heater element 45 will be energized to create a false ambient of ten degrees about the thermostat as outlined above. If the outdoor temperature becomes sufficient to cause indoor temperature to increase to a value of approximately 75° F., thermostat 34 will engage contact 48 due to the fact that the false ambient of ten degrees raises the temperature surrounding the thermostat to 85° at which temperature the thermostat moves into engagement with contact 48. Thereupon the relay 33 is deenergized and the cooling system is placed into operation. If it is "on" for only a very brief interval, which would be the case if the outside temperature becomes sufficient to cause indoor temperature to increase to practically 74°, then the thermostat 34 moves to the right substantially immediately to again energize relay 33 and cut out the refrigerating apparatus. It may be noted that in this event the heater element 45 is energized substantially continuously to maintain a false ambient of about ten degrees. With this false ambient the operation will be such as to maintain a temperature of approximately 75° within the space in the manner described. The effect of the false ambient is thus, in effect, to sub-calibrate the thermostat ten degrees.

Supposing now that the outside temperature becomes sufficient to cause indoor temperature to increase to such a value that the cooling apparatus is in operation approximately half of the time then the heater element 45 will be energized approximately half of the time and the average heating effect thereof be decreased by the same amount. Consequently, the false ambient created thereby will be but five degrees and the thermostat will likewise be sub-calibrated a like amount. It will therefore be actuated into engagement with its respective contacts at temperatures of 79° and 80°.

If the outside temperature increases to such a value that the cooling apparatus is in operation substantially continuously the heating effect of the element 45 is practically nil due to the fact that it is deenergized substantially all of the time. Consequently, the false ambient and sub-calibration will be practically zero and the thermostat will operate at its actual operating temperature values of 84° and 85°. Thus, it may be seen that when the outside temperature is between certain minimum and maximum limits the cooling apparatus is operated to maintain the temperature within the cooled space at values increasing with the percentage of time that the cooling apparatus is operative. The cooling apparatus is operated only during the time that the temperature within the space exceeds the variable temperature value which is being varied by the variable heating action of the element 45 between the minimum and maximum limits in accordance with the cumulative lengths of time that the temperature of the space is above and below said variable value during a predetermined period. This period is always sufficiently long to include both the times during which the cooling apparatus is in operation and the times during which the cooling apparatus is not in operation so that the element 45 will have full opportunity of attaining its average temperature which is dependent upon the cumulative heating and cooling effect resulting from the varying periods of energization and deenergization of coil 45.

It will be obvious to those skilled in the art that the heating capacity of the resistance element may be varied between desirable limits to vary the false ambient about the thermostat and the degree of sub-calibration. When greater sub-calibration is desired, that is, when the temperature limits between which a variable temperature is to be maintained within the space is extended, then it is necessary to increase the heating capacity of the resistance. If the capacity is sufficient to raise the temperature of the thermostat about 10°, as the present embodiment, there would be a tendency for the cooling apparatus to be placed in operation at comparatively frequent intervals, due to the rapid heating and cooling of the resistance when it is energized and deenergized. In order to smooth the operation of the system and decrease the frequency of operation I have constructed the resistance with a high time constant, as previously described. It may be seen that by so constructing the heating element it will be heated comparatively slowly, and similarly, will cool with comparative slowness. Thus the frequency of operation will be decreased in a desirable fashion.

In Fig. 2 I have illustrated another embodiment of my invention in which I have utilized a normally deenergized compressor motor. In this embodiment, as in the embodiment of Fig. 1, the heater element 45 is energized whenever the room thermostat is below a certain temperature value, that is, at all times when the cooling apparatus is not in operation. The relay is energized when the temperature rises to a predetermined value and thermostat 34 engages contact 48 closing an energizing circuit for the relay 33 through electrical connection 38, relay 33, electrical connection 50, thermostat 34, contact 48 and electrical connection 51. Energization of the relay 33 and consequent upward movement of its associated armature energizes compressor motor 30 by closure of switch 32 and simultaneously therewith a holding circuit for the relay is closed by interconnection of contacts 41 and 42. When the room has been cooled sufficiently thermostat 34 makes engagement with contact 43 placing a short circuit across the relay through electrical connection 52. The relay is thereby deenergized to place the refrigerating system out of operation.

The operation of the modification illustrated in Fig. 2 is the same in all respects as that of Fig. 1. In both cases the heater element 45 is energized only when the cooling apparatus is out of operation. It will be obvious that, as with the modification of Fig. 1, when the room temperature is below a certain minimum value the thermostat is pre-heated so that it will operate at a temperature dependent upon the average heating effect of the heater coil 45. When the temperature is above a predetermined maximum value the thermostat operates to cause the deenergization of the compressor motor at a temperature dependent only upon the characteristics of the thermostat due to the fact that the heater element is short circuited and inoperative. When the temperature is in between the predetermined limits the cooling apparatus is operated to maintain the temperature at a value dependent upon the percentage of time the cooling apparatus is in operation, in the manner already described in connection with Fig. 1.

What I claim as new and desire to secure by Letters Patent of the United States, is:

1. In a cooling system, the combination including means for cooling a space, thermal responsive means calibrated to operate to "on" and "off" positions at predetermined temperatures and positioned within said space for initiating and terminating the operation of said cooling means, and calibration regulating means for said thermal responsive means including a timing means connected to be set into operation under the control of said thermal responsive means for varying the calibration of said thermal responsive means toward a predetermined lower limit upon the termination of operation of said cooling means an amount dependent upon the time that the cooling means remains out of operation and for varying the calibration of said thermal responsive means towards a predetermined upper limit upon the initiation of operation of said cooling means an amount dependent upon the time that the cooling means remains in operation.

2. In a cooling system, the combination including refrigerating apparatus for cooling a space, electrical means controlling the operation thereof, means including a thermal responsive device calibrated to operate to its "on" and "off" positions at predetermined temperatures and positioned within said space for controlling the energization of said last mentioned means for initiating and terminating operation of said cooling means, and calibration regulating means for said thermal responsive device including a heat storage mass and a heater therefor having the energization thereof varied under the control of said thermal responsive device upon the initiation and termination of operation of said cooling means for varying the calibration of said thermal responsive device respectively towards a maximum temperature limit an amount dependent upon the length of time the cooling means remains in operation and towards a minimum temperature limit an amount dependent upon the length of time the cooling means remains out of operation.

3. In combination, an enclosed space, means including refrigerating apparatus for cooling said space, means including an electrical motor and an associated energizing circuit for operating said apparatus, means for selectively controlling the energization of said circuit in response to temperature variations within said space, said means including a relay closing said circuit when said relay is deenergized, an energizing circuit for said relay, thermal responsive means located in said space controlling said relay circuit and adapted at a predetermined maximum temperature to deenergize said relay for initiating the operation of said cooling means and to energize said relay at a predetermined minimum temperature for terminating the operation of said cooling means, and local heating means in proximity to said thermal responsive means and controlled thereby for causing said thermal responsive means to control said relay at increasing space temperatures as the length of time the cooling means is in operation increases.

4. In combination, an enclosed space, means including refrigerating apparatus for cooling said space, means including an electrical motor and an associated energizing circuit for operating said apparatus, means for selectively controlling the energization of said circuit in response to temperature variations within said space, said means including a relay adapted to close said circuit when energized, an energizing circuit for said relay, thermal responsive means located in said space controlling said relay circuit and adapted at a predetermined maximum temperature to energize said relay for initiating the operation of said cooling means and to deenergize said relay at a predetermined minimum temperature to terminate the operation of said cooling means, and means including local heating means in proximity to said thermal responsive means and operable under the control of said thermal responsive means for causing said thermal responsive means to control said relay at increasing space temperatures as the length of time the cooling means is in operation increases.

5. The method of cooling a space, comprising operating the space cooling means during the time that the temperature within the space exceeds a predetermined value while varying said predetermined value between predetermined minimum and maximum limits in accordance with variations in the percentage of the time that the temperature within said space exceeds said value.

6. The method of cooling a space which comprises regulating the space cooling means responsively to variations of the temperature within said space above and below a predetermined value while varying said value in accordance with a predetermined variable function dependent upon the relative lengths of time that the temperature within said space is above and below said predetermined value.

7. The method of cooling a space which comprises operating the space cooling means upon variation of the temperature within said space above a predetermined value while varying said predetermined value between predetermined maximum and minimum limits substantially in accordance with variations in the relative lengths of time that the temperature within said space is above and below said predetermined value.

8. The method of cooling a space, comprising operating the space cooling means during the time that the temperature within the space exceeds a predetermined value while increasing said predetermined value toward a predetermined maximum limit during the operating time of the cooling means an amount dependent upon said operating time and decreasing said predetermined value toward a predetermined minimum limit during the non-operating time of the cooling means an amount dependent upon said non-operating time.

9. The method of cooling a space comprising operating the space cooling means during the time that temperature within the space exceeds a predetermined value while gradually varying said predetermined value toward a predetermined upper limit during the operating time of the space cooling means and toward a predetermined lower limit during the non-operating time.

10. In a cooling system for an enclosed space, the combination including means for supplying cooling medium to said space, means responsive to the temperature within said space for controlling the supply of said cooling medium, heating means for sub-calibrating the response temperature of said second mentioned means, and means controlled by said second mentioned means for decreasing the heating action of said heating means when cooling medium is supplied to said space and increasing the heating action of said heating means when cooling medium is not supplied to said space.

11. In a space cooling system, the combination of means for cooling a space, a thermostatic device responsive to the temperature of said space and having control means operable upon opposite variations of the temperature of said space over a limited range for starting and stopping operation of said cooling means, and automatic means for regulating the calibration of said thermostatic device including a high time constant thermal timing device operable under the control of said control means for respectively raising and lowering both of the limits of the space temperature range in which said control means is operated between predetermined minimum and maximum temperature values substantially in accordance with variations in the relative lengths of time that said cooling means is respectively in operation and out of operation.

12. In combination, means for cooling a space, a heat storage mass in said space having local heating means, and thermostatic means responsive to the space temperature and having means for varying the calibration thereof over a predetermined range in accordance with variations in the temperature of said mass for both starting and stopping operation of said cooling means at different temperature values within said range and simultaneously controlling said heating means to vary said values toward the upper limit of said range during the operating time of said cooling means and toward the lower limit of said range during the non-operating time.

13. In combination, heat transfer means for controlling the temperature of space, a heat storage mass in said space having local heating means, a thermostatic device for varying the temperature controlling operation of said heat transfer means responsively to variations in the temperature of said space from a predetermined variable value and having calibrating means responsive to the temperature of said mass for varying the space temperature value at which said device responds between predetermined limits, and means under the control of said device for varying the heating operation of said local heating means upon variation in the temperature controlling operation of said heat transfer means.

14. In a temperature control system, in combination, means operable for changing the temperature of a space, means including a thermostat responsive to changes in the temperature of the space for starting and stopping operation of said temperature changing means to maintain the space substantially in thermal equilibrium, and means for adjusting said thermostat to raise the space equilibrium temperature as the demand for operation of said temperature changing means increases including an electric heater having the energization thereof controlled by said thermostat in a predetermined relation with the operation of said temperature changing means.

15. In a temperature control system for a space, in combination, means for changing the temperature of said space, an electromagnetic controller for said temperature changing means, said electromagnetic controller being operative when energized to place said temperature changing means in operation, while acting when deenergized to place said temperature changing means out of operation, a control circuit for said electromagnetic controller, a thermostat responsive to the temperature of said space for controlling said control circuit, said thermostat comprising a thermostatic element, switching means connected to said control circuit and actuated by said thermostatic element, and means including an electric heater for varying the value of space temperature at which said thermostatic element actuates said switching means to energize and deenergize said electromagnetic controller, said thermostatic element actuating said switching means to energize said electromagnetic controller upon change in space temperature opposite to the effect of said temperature changing means for causing a period of operation of the temperature changing means, actuating said switching means to deenergize said electromagnetic controller upon change in space temperature corresponding to the effect of said temperature changing means for causing a period of non-operation of said temperature changing means, and means for energizing and deenergizing said electric heater in predetermined relationship with operation and non-operation of said temperature changing means in a manner to raise the temperature maintained in said space as the demand for operation of said temperature changing means increases.

16. In a temperature control system, in combination, means operable for changing the temperature of a space, means including a thermostat operable responsively to changes in the temperature of the space between the limits of a desired temperature range for starting and stopping operation of said temperature changing means to maintain the space substantially in thermal equilibrium at temperatures within said range, and means for adjusting said thermostat to raise both limits of said temperature range as the demand for operation of said temperature changing means increases including an electric heater havng the energization thereof controlled by said thermostat in a predetermined relation with the operation of said temperature changing means.

17. In a temperature control system, in combination, electric motor operated means for changing the temperature of a space, electric circuit control means including a thermostat responsive to changes in temperature of the space and having contacts for starting and stopping operation of said electric motor driven temperature changing means at the limits of a desired temperature range to maintain the space substantially in thermal equilibrium at temperatures within said range, and means for adjusting said thermostat to effect operation of said contacts at the limits of progressively higher temperature ranges as the demand for operation of said temperature changing means increases including an electric heater having the energization thereof controlled by said control means in a predetermined relation with the operation of said temperature changing means.

HARRY R. CRAGO.